(12) United States Patent
Ishikawa

(10) Patent No.: US 6,933,044 B2
(45) Date of Patent: Aug. 23, 2005

(54) RESIN MOLDED PRODUCT HAVING METALLIC LUSTER SURFACE

(75) Inventor: Akira Ishikawa, Nishitokyo (JP)

(73) Assignee: Teikoku Printing Inks Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/271,289

(22) Filed: Oct. 15, 2002

(65) Prior Publication Data

US 2003/0077463 A1 Apr. 24, 2003

(30) Foreign Application Priority Data

Oct. 19, 2001 (JP) ........................................ 2001-321277
Feb. 21, 2002 (JP) ........................................ 2002-044643

(51) Int. Cl.[7] .............................. B32B 5/16; B32B 15/08
(52) U.S. Cl. ...................... 428/323; 428/328; 428/457; 428/458; 428/461
(58) Field of Search ................................. 428/323, 328, 428/458, 457, 461

(56) References Cited

U.S. PATENT DOCUMENTS 3,839,129 A * 10/1974 Neumann ...................... 161/4
3,962,397 A * 6/1976 Narui et al. .................. 264/144
6,364,992 B1 * 4/2002 Nambu et al. ............... 156/277
6,652,983 B1 * 11/2003 Mori ........................... 428/480

FOREIGN PATENT DOCUMENTS

| JP | 60-44316 | 3/1985 | | |
| JP | 2-32419 | 9/1990 | | |
| JP | 9-183136 | 7/1997 | | |
| JP | 9-268269 | 10/1997 | | |
| JP | 411114093 A | * 4/1999 | ........... | A63B/37/00 |
| JP | 2001146221 A | * 5/2001 | ........... | B65D/1/12 |

* cited by examiner

*Primary Examiner*—Monique R. Jackson
(74) *Attorney, Agent, or Firm*—Jordan and Hamburg LLP

(57) ABSTRACT

A resin molded product having a metallic luster surface is provided without utilizing chromium plating which may cause environmental pollution. The resin molded product 1 is composed of a transparent sheet 2, a metallic luster layer 3 formed on reverse side of transparent sheet 2, and a synthetic resin 4 integrally molded on the reverse side of metallic luster layer 3. The transparent sheet 2 consists of a sheet having heat resistance, such as polycarbonate having transparency, polyester sheet, etc. The metallic luster layer 3 is a metal vacuum evaporated layer formed by vacuum evaporation on the reverse side of transparent sheet 2, or a printed layer formed by printing using a luster-producing ink.

9 Claims, 2 Drawing Sheets

RESIN MOLDED PRODUCT HAVING METALLIC LUSTER SURFACE

BACKGROUND OF THE INVENTION

1. Field of the Invention

The present invention relates to a resin molded product having a metallic luster surface.

2. Description of the Related Art

Chromium plating has been performed in order to give metallic luster to a surface of conventional form present in various products. However, chromium plating is a possible cause of environmental pollution, which may result in injury to an operator's health.

SUMMARY OF THE INVENTION

An object of the present invention is to provide a resin molded product having a metallic luster surface, without utilizing chromium plating which may be the cause of environmental pollution.

In order to solve by the present invention the above described problems caused by producing a resin molded product having a metallic luster surface by chromium plating, a metallic luster-layer consisting of a metal vacuum evaporated layer is formed on the reverse side of a transparent sheet, i.e. the side away from the outer surface of the molded product and then a synthetic resin is integrally formed onto the above described reverse side of the sheet in which such metallic luster layer is formed. In this case, metal vacuum evaporation may be directly performed onto the reverse side of the transparent sheet to form a metallic luster layer consisting of a metal vacuum evaporated layer, or the metal vacuum evaporation is performed on a separately prepared release sheet to form a separable metal vacuum evaporated layer on this release sheet, and then this metal vacuum evaporated layer may be adhered to a backside of the above described transparent sheet, and, subsequently the above described release sheet may be removed. When such a process is adopted, in order to increase the adhesiveness between the metal vacuum evaporated layer surface and the reverse side of the above described transparent sheet, it is preferable that a heat fusible binder is coated on the surface of the metal vacuum evaporated layer beforehand, and then the metal vacuum evaporated layer is adhered by pressure with heat to the above described reverse side of the transparent sheet.

Thus, if a synthetic resin is integrally formed on a reverse side of a transparent sheet on which the metallic luster layer is formed such layer is viewed through the transparent sheet, and an attractive effect, similar to that resulting from metal plating is achieved, when the resin molded product concerned is observed from the outside.

Moreover, in the present invention, a metallic luster layer is formed by printing using an ink which when applied results in said metallic luster referred to hereinafter as a "luster-producing" ink, on the reverse side of a transparent sheet, and a synthetic resin is integrally formed on the above described reverse side of the sheet on which the metallic luster layer is formed. Therefore when the resin molded product is observed from the outside, the metallic luster layer of the reverse side is viewed through a transparent sheet, and an attractive effect similar to that of metal plating is achieved.

Moreover, the above described metallic luster layer formed by printing in the present invention is a printed layer by a luster-producing ink containing pieces of aluminum foil each having a thickness of no more than 0.5 $\mu$m, preferably no more than 0.25 $\mu$m, and more preferably no more than 0.05 $\mu$m as a principal component of the foil. Therefore, in the present invention, a luster-producing ink is an ink including pieces of aluminum foil having a thickness no more than 0.5 $\mu$m, preferably no more than 0.25 $\mu$m, and more preferably no more than 0.05 $\mu$m as a principal component of the foil.

If the thickness of aluminum foil used exceeds 0.5 $\mu$m, a specular surface luster equivalent to metal plating will not be present on the surface of the resin molded product.

In addition, the aluminum foil used preferably comprises pieces of aluminum foil each having a foil area of 10 $\mu m^2$ to 2000 $\mu m^2$ as a principal component. In order to determine the foil area, a fully diluted ink is observed under a microscope, and an image analysis of the area of the observed pieces of foil is carried out to determine the area of the pieces of foil. Therefore, an area of each piece of foil represents an area of one of the two surfaces of the piece of foil. When there are many pieces of foil each having a foil area of no more than 10 $\mu m^2$, advanced specular luster may not be obtained. Moreover, when there are many pieces of foil each having no less than 2000 $\mu m^2$ of foil area, streaks and uneven prints will tend to result in printing of screen-stencil, gravure, flexographic printing, etc. Therefore, a foil area of each of the pieces of a principal component of the aluminum foil used for the present invention is preferably 10 $\mu m^2$ to 2000 $\mu m^2$, and more preferably 10 $\mu m^2$ to 1500 $\mu m^2$.

Moreover, in a resin molded product having a metallic luster surface of the present invention, a sheet on which the above described metallic luster layer is formed by printing with a luster-producing ink is initially shaped, and the above described synthetic resin is integrally formed on the above described reverse side. That is, when a resin molded product has various surface configurations, the transparent sheet on which metallic luster layer is formed is first shaped to conform to the surface configuration to which it is applied.

Since the above described metallic luster layer is a printed layer by a luster-producing ink comprising pieces of the above described aluminum foil as a principal component of the foil, very thin pieces of the aluminum foil piles repeatedly without any space among them to constitute such printed layer. Therefore, even if the transparent sheet is extended by shaping and the metallic luster layer is also extended in connection with shaping, although pieces of aluminum foil in a section where the metallic luster layer concerned is extended are moved in an extended direction, no space will be formed among laps of the pieces of aluminum foil. Therefore, cracks and fractures in the metallic luster layer are little formed in the extended section, and a shaped resin molded product having a metallic luster layer that has neither cracks nor fractures may be provided.

In order to easily perform the above described shaping, it is common to soften with heat the transparent sheet printed with a luster-producing ink, and to perform shaping by press forming, vacuum forming, pressurized-air forming, etc.

Moreover, a synthetic resin is preferably formed integrally by insert molding on the above described backside of a sheet on which metallic luster layer is formed, said "insert molding" being defined as a "method comprising shaping said sheet containing a metallic luster layer into the form of a mold, inserting said shaped sheet into said mold, and injecting said synthetic resin into said mold where it becomes integrally bonded to said shaped sheet".

Moreover, in the present invention, a middle resin layer is further prepared between the above described metallic luster layer and the above described integrally molded synthetic resin. Operational advantages of following (1) and (2) will be demonstrated by preparing this middle resin layer.

(1) When a synthetic resin heated and melted at elevated temperature is integrally molded by insertion molding etc. on the above described reverse side of a sheet with which a metallic luster layer is formed, this middle resin layer may prevent the luster-producing ink layer forming the metallic luster layer from being melted and moved by the heat and flow of the injected resin thus reducing luster, and may also prevent heat deformation from damaging the metallic luster layer.

(2) Adhesive strength between the metallic luster layer and the synthetic resin integrally molded will be improved by the middle resin layer.

Moreover, the above described middle resin layer comprises one or more layers. In the case of two layers, the first layer (the layer that touches a metallic luster layer) is preferably a layer consisting of a partially cross-linked thermoplastic resin. The second layer (the layer that touches an integrally molded synthetic resin) is preferably a layer consisting of a thermoplastic resin without cross-link or, with a degree of cross-link lower than the first layer.

In addition, the middle resin layer may include pigments etc.

Moreover, in the present invention, as a method of preparing a middle resin layer, a method is commonly used in which a metallic luster layer is formed on the reverse side of a transparent sheet, and an ink or a coating agent including a resin component and/or a cross-linking agent, etc. constituting a middle resin layer is printed or coated on the metallic luster layer.

DETAILED DESCRIPTION OF THE PREFERRED EMBODIMENTS

Hereinafter, embodiments of the present invention will be described with reference to figures.

(The First Embodiment)

Figure 1:
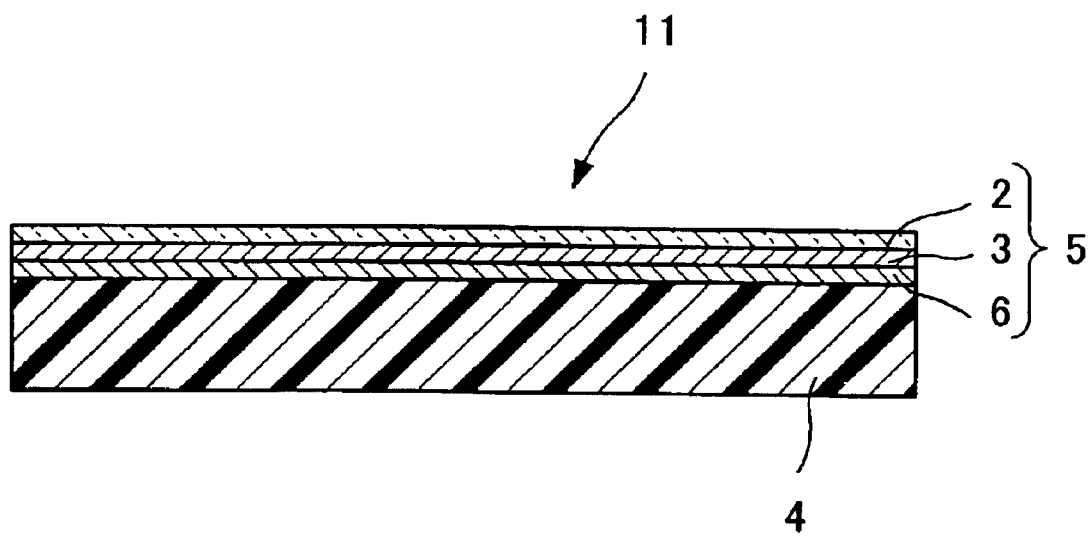
FIG. 1 is a sectional view showing the first embodiment of the present invention.

As is shown in FIG. 1, a resin molded product 11 is composed of a transparent sheet 2, a metallic luster layer 3 formed on the reverse side of transparent sheet 2, a middle resin layer 6 laminated onto the reverse side of metallic luster layer 3, and a synthetic resin 4 integrally molded onto a backside of this middle resin layer 6. The transparent sheet 2 consists of a sheet of polycarbonate, polyester sheet etc. having transparency and heat resistance. A metallic luster layer 3 is a layer formed by a method in which a metal is directly vacuum evaporated to the reverse side of a transparent sheet 2, or a layer that is prepared by a method in which metal vacuum evaporation is performed on a release sheet currently prepared separately, heat welding binder is coated on a separable metal vacuum evaporated layer formed on this release sheet, and then the coated layer is adhered to the reverse side of the above described transparent sheet with heat and peeled off the release sheet. In order to protect the reverse side of the above described metal vacuum evaporated layer, full surface printing is given by a polyester ink to form a middle resin layer 6.

As a result, the surface of the transparent sheet 2 has advanced specular luster. Next, a metallic luster sheet 5 with which a metallic luster layer 3 and a middle resin layer 6 are thus formed on the reverse side of the transparent sheet 2 is set in a metal mold with a reverse side having the middle resin layer 6 being faced inside. Subsequently, a synthetic resin melted with heat is injected into the above described metal mold, and after the synthetic resin 4 solidified, the mold is opened. Thus, molding of an illustrated resin molded product 11 is completed.

When the resin molded product 11 concerned is observed from outside, the metallic luster layer 3 on the reverse side is viewed through the transparent sheet 2, and an attractive effect similar to metal plating is achieved. Therefore, a resin molded product 11 having a metallic luster surface is obtained, without chromium plating which may be a cause of environmental pollution.

(The Second Embodiment)

Figure 2:
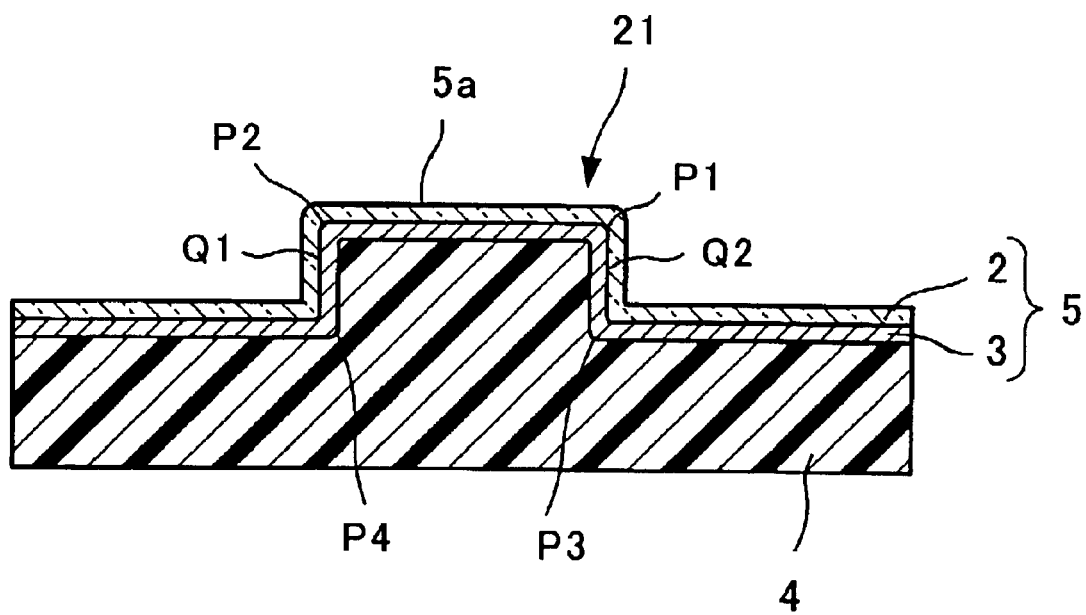
FIG. 2 is a sectional view showing the second embodiment of the present invention.

FIG. 2 shows a resin molded product 21 composed of a transparent sheet 2, a metallic luster layer 3 formed on the reverse side of transparent sheet 2, and a synthetic resin 4 integrally molded on the reverse side of metallic luster layer 3. The transparent sheet 2 consists of a sheet of polycarbonate, polyester sheet etc. having transparency and heat resistance. A metallic luster layer 3 is a printed layer currently formed on the reverse side of transparent sheet 2 by printing using a luster-causing ink A or B comprising the following components.

Luster-producing ink A; aluminum foil having pieces of aluminum foil each with a thickness of 0.25 $\mu$m and a foil area of 20 to 2000 $\mu m^2$ as a principal component 100 parts by weight, polyester resin 40 parts by weight, ester based solvent 800 parts by weight, and ketone based solvent 500 parts by weight.

Luster-producing ink B; aluminum foil having pieces of aluminum foil each with a thickness of 0.03 $\mu$m and a foil area of 10 to 2000 $\mu m^2$ as a principal component 100 parts by weight, polyurethane resin 55 parts by weight, cellulose derivatives 10 parts by weight, and ester based solvent 1500 parts by weight.

Resin molded product 21 is manufactured by a method for production comprising following processes. The above described luster-producing ink A or B is used, and gravure or screen-printing is effected onto the reverse side of the transparent sheet 2. Thereby, a metallic luster layer 3 is formed on the reverse side of the transparent sheet 2, and the surface of the transparent sheet 2 has advanced specular luster.

Then, a metallic luster sheet 5 in which the metallic luster layer 3 is formed on the reverse side of the transparent sheet 2, is shaped into a form having a circular convex portion 5a in a central section viewed from the upper direction, by a vacuum forming, a pressurized-air forming, etc. as is shown in FIG. 2. Since the above described metallic luster layer 3 is a printed layer by a luster-producing ink containing pieces of the above described aluminum foil as a principal foil component, flakes of aluminum foil pile to constitute this printed layer. Therefore, when the transparent sheet 2 is extended in rising section Q1 and Q2 by shaping, and the metallic luster layer 3 is extended in connection with the rising, metallic luster similar to that of the specular surface of a section where the metallic luster layer concerned is extended will not be lost. Moreover, in curved portions P1, P2, P3, and P4, neither cracks nor fractures appear in the metallic luster layer.

Furthermore, this shaped metallic luster sheet 5 is set into a metal mold with the reverse side having metallic luster layer 3 faced inside, and subsequently a synthetic resin melted with heat is injected into the above described metal mold, and the mold is opened after the synthetic resin 4 is solidified. Thereby, as illustrated, molding of a resin molded product 21 having convex portion 5a in a central section is completed.

When this resin molded product 21 is observed from outside, metallic luster is observed on the whole area of the resin molded product through the transparent sheet 2, neither cracks nor fractures are observed in portions P1, P2, P3, and P4, and an attractive effect similar to metal plating is achieved. Therefore, a resin molded product 21 having a metallic luster surface is obtained, without the use of chromium plating which may cause environmental pollution.

(The Third Embodiment)

Figure 3:
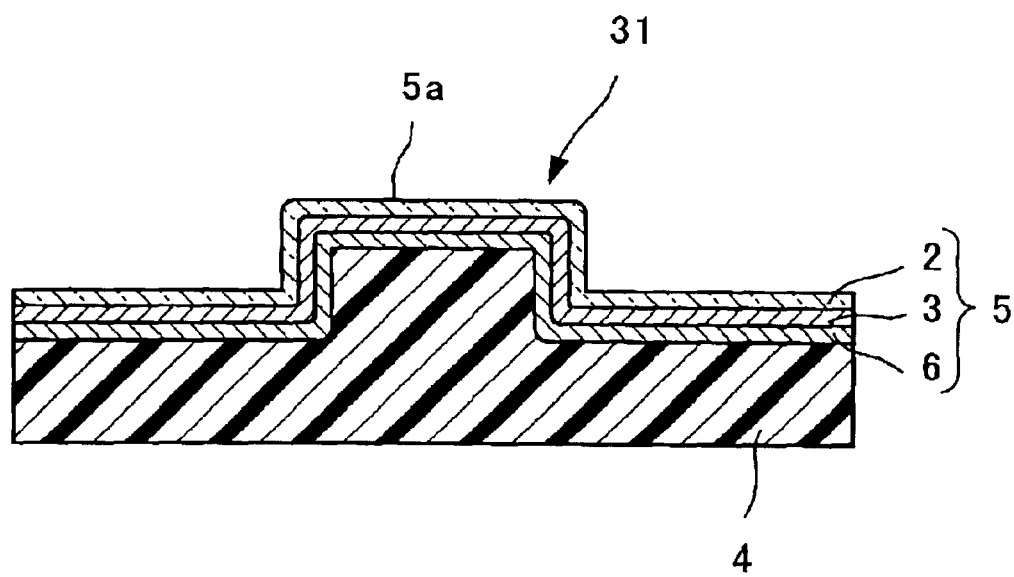
FIG. 3 is a sectional view showing the third embodiment of the present invention.

FIG. 3 shows a resin molded product 31 composed of a transparent sheet 2, a metallic luster layer 3 formed on the reverse side of transparent sheet 2, a middle resin layer 6 laminated onto the reverse side of metallic luster layer 3, and a synthetic resin 4 integrally molded on the reverse side of middle resin layer 6. The middle resin layer 6 consists of a partially cross-linked thermoplastic resin having polyester resin as a principal component.

Resin molded product 31 is manufactured by a method of production comprising the following steps: printing is effected on the reverse side of transparent sheet 2 using luster-producing ink A or B mentioned above to form a metallic luster layer 3. Furthermore, printing is effected on metallic luster layer 3, using an ink consisting of a polyester resin and a small amount of cross-linking agent to form a middle resin layer 6.

Then, a metallic luster sheet 5 in which the metallic luster layer 3 and the middle resin layer 6 are formed on the reverse side of the transparent sheet 2 is shaped into a form having convex portion 5a in a central section, as illustrated, by vacuum forming, pressurized-air forming, etc. At this time, neither cracks nor fractures are formed in the above described sections Q1, Q2, P1, P2, P3, and P4 (refer to FIG. 2) of the metallic luster layer 3 as described above.

Furthermore, shaped metallic luster sheet 5 is set in a metal mold so that the reverse side composed of a middle resin layer 6 may face inside, and subsequently a synthetic resin melted with heat at an elevated temperature is injected into the above described metal mold. At this time, direct contact between the injected resin melted at an elevated temperature and the metallic luster layers 3 are blocked by the middle resin layer 6. Thereby, the luster-producing ink that forms the metallic luster layer 3 is not melted nor moved by heat and flow of the injected resin, and as a result undesirable luster decrease may be prevented.

When the injected synthetic resin 4 is solidified, the synthetic resin 4 will be firmly integrated by the middle resin layer 6 with the transparent sheet 2 on which the metallic luster layer 3 is formed. The mold is subsequently opened, and as illustrated, a resin molded product 31 having convex portion 5a in a central section and a metallic luster surface will be obtained.

(The Fourth Embodiment)

Figure 4:
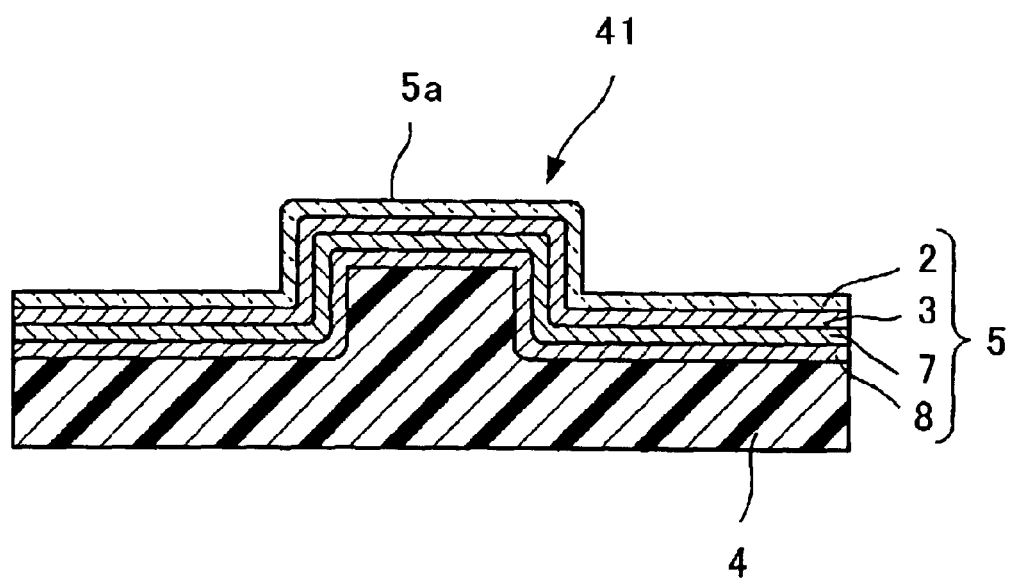
FIG. 4 is a sectional view showing the fourth embodiment of the present invention.

FIG. 4 shows a resin molded product 41 composed of a transparent sheet 2, a metallic luster layer 3 formed on the reverse side of transparent sheet 2, a first middle resin layer 7 laminated to the reverse side of this metallic luster layer 3, a second middle resin layer 8 integrally formed on the reverse side of first middle resin layer 7, and a synthetic resin 4 integrally molded on the reverse side of second middle resin layer 8.

The first middle resin layer 7 consists of a partially cross-linked thermoplastic resin. The second middle resin layer 8 consists of a thermoplastic resin without cross-linking, or with a degree of cross-link lower than the first middle resin layer 7.

Molded product 41 is manufactured by a method for production consisting of the following steps: a similar luster-producing ink mentioned above is used, printing is effected on the reverse side of the transparent sheet 2 to form the metallic luster layer 3. Then, printing is effected on the metallic luster layer 3 to form the first middle resin layer 7 using an ink including a polyester resin and a cross-linking agent. Furthermore, printing is effected on the first middle resin layer 7, using, for example, a resin without cross-linking such as vinyl chloride-vinyl acetate copolymer, or a thermoplastic resin including cross-linking agents fewer than those in the first middle resin layer 7 as ink to form the second middle resin layer 8.

Then, a metallic luster sheet 5 in which the metallic luster layer 3, the first middle resin layer 7, and the second middle resin layer 8 are formed on the reverse side of transparent sheet 2 is shaped into an illustrated form having convex portion 5a in a central section by vacuum forming, pressurized-air forming, etc. At this time, neither cracks nor fractures appear in the above described sections Q1, Q2, P1, P2, P3, and P4 of the metallic luster layer 3 (refer to FIG. 2) as described above.

Furthermore, shaped metallic luster sheet 5 is set into a metal mold with the reverse side of the second middle resin layer 8 being faced inside, and subsequently a synthetic resin melted by heat at an elevated temperature is injected into the above described metal mold. At this time, direct contact between the injected melted resin at an elevated temperature and the metallic luster layer 3 is prevented by the first, and second middle resin layers 7 and 8. Thereby, a luster-producing ink that forms the metallic luster layer 3 is not melted or moved by the heat and flow of the injected resin, and as a result an undesirable luster decrease may be prevented.

When the injected synthetic resin 4 is solidified, the synthetic resin 4 will be bonded to the second middle resin layer 8, and firmly integrated by the first and second middle resin layers 7 and 8 with the transparent sheet 2 on which the metallic luster layer 3 is formed. The mold is subsequently opened, and as illustrated, a resin molded product 41 having convex portion 5a in a central section and a metallic luster surface will be obtained. This molded product showed a very strong bond strength between the metallic luster sheet and the synthetic resin 4.

In addition, although molded products having convex position 5a in a central section are shown as resin molded products 21, 31, and 41 in the embodiments it is clear that the present invention may be applied also in molded products having more complicated concavo-convex forms etc., or flat-shaped resin molded products.

As described above, adopting the present invention, a resin molded product having a metallic luster surface or advanced specular luster and having an attractive effect similar to metal plating can be provided, without the use of chromium plating which may cause environmental pollution and injury to an operator's health.

What is claimed is:

1. A resin molded product having a metallic luster surface, wherein a metallic luster layer is formed on the reverse side of a transparent sheet by printing using a luster-producing ink, and a synthetic resin is integrally formed on said reverse side of a sheet having the metallic luster layer formed thereon, said luster-producing ink being an ink which includes pieces of aluminum foil each having a thickness of no more than 0.5 $\mu$m as a principal component and which when applied results in said metallic luster.

2. The resin molded product having a metallic luster surface according to claim 1, wherein said sheet having a metallic luster layer formed thereon is shaped, and said synthetic resin is integrally formed on said reverse side.

3. The resin molded product having a metallic luster surface according to claim 1 or 2, wherein said synthetic resin is molded by an insertion molding method comprising shaping said sheet containing a metallic luster layer into the form of a mold, inserting said shaped sheet into said mold, and injecting said synthetic resin into said mold where it becomes integrally bonded to said shaped sheet.

4. The resin molded product having a metallic luster surface according to claim 1 or 2, wherein a middle resin layer is further prepared between said metallic luster layer and said synthetic resin integrally formed.

5. The resin molded product having a metallic luster surface according to claim 3, wherein a middle resin layer is further prepared between said metallic luster layer and said synthetic resin integrally molded.

6. The product of claim 1, wherein said thickness is no more than 0.25 $\mu$m.

7. The product of claim 6, wherein said thickness is no more than 0.05 $\mu$m.

8. The product of claim 1 wherein said pieces of aluminum foil each has a foil area of from 10 $\mu$m$^2$ to 2000 $\mu$m$^2$.

9. The product of claim 8 wherein said foil area is from 10 $\mu$m$^2$ to 1500 $\mu$m$^2$.

* * * * *